(12) United States Patent
Miyao

(10) Patent No.: US 10,283,818 B2
(45) Date of Patent: May 7, 2019

(54) ELECTRONIC DEVICE

(71) Applicant: DENSO CORPORATION, Kariya, Aichi-pref. (JP)

(72) Inventor: Masanori Miyao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 158 days.

(21) Appl. No.: 15/109,948

(22) PCT Filed: Dec. 24, 2014

(86) PCT No.: PCT/JP2014/006411
§ 371 (c)(1),
(2) Date: Jul. 6, 2016

(87) PCT Pub. No.: WO2015/104770
PCT Pub. Date: Jul. 16, 2015

(65) Prior Publication Data
US 2016/0329607 A1 Nov. 10, 2016

(30) Foreign Application Priority Data
Jan. 8, 2014 (JP) ................................. 2014-001627

(51) Int. Cl.
*H01M 10/48* (2006.01)
*H01M 10/615* (2014.01)
(Continued)

(52) U.S. Cl.
CPC ....... *H01M 10/425* (2013.01); *H01M 2/1055* (2013.01); *H01M 10/48* (2013.01);
(Continued)

(58) Field of Classification Search
CPC ............... H01M 10/637; H01M 10/48; H01M 10/5026; H01M 2/10; H01M 10/42;
(Continued)

(56) References Cited

U.S. PATENT DOCUMENTS

2011/0266875 A1   11/2011   Shimura et al.

FOREIGN PATENT DOCUMENTS

JP          01218330 A   *   8/1989   ................ H02J 7/00
JP          H01218330 A      8/1989
(Continued)

OTHER PUBLICATIONS

U.S. Appl. No. 15/109,937, filed Jul. 6, 2016, Miyao et al.

*Primary Examiner* — Karie O'Neill Apicella
(74) *Attorney, Agent, or Firm* — Harness, Dickey & Pierce, P.L.C.

(57) ABSTRACT

There is provided an electronic device that can heat an auxiliary battery as a standby power supply and check a function of the auxiliary battery with a simpler configuration. The device is provided with a heater resistor for heating an auxiliary battery incorporated in an in-vehicle emergency notification device as a standby power supply for a main battery, and is also provided with first and second power supply switches for forming first and second power supply paths for supplying power from the main battery and the auxiliary battery to the heater resistor, respectively. A control circuit controls the first and second power supply switches to form the power supply paths so as to conduct a current to the heater resistor.

13 Claims, 16 Drawing Sheets

(51) Int. Cl.
  *H01M 10/625* (2014.01)
  *H01M 10/643* (2014.01)
  *H01M 10/6554* (2014.01)
  *H01M 10/6571* (2014.01)
  *H01M 10/42* (2006.01)
  *H01M 2/10* (2006.01)
  *H02J 1/06* (2006.01)
  *H02J 7/00* (2006.01)

(52) U.S. Cl.
  CPC ....... *H01M 10/615* (2015.04); *H01M 10/625* (2015.04); *H01M 10/643* (2015.04); *H01M 10/6554* (2015.04); *H01M 10/6571* (2015.04); *H02J 1/06* (2013.01); *H02J 7/00* (2013.01); *H01M 2220/20* (2013.01)

(58) Field of Classification Search
  CPC ........... H01M 10/425; H01M 10/6571; H01M 10/615; H01M 10/625; H01M 10/643
  See application file for complete search history.

(56) References Cited

FOREIGN PATENT DOCUMENTS

| JP | H09213459 A   |   | 8/1997  |           |
|----|---------------|---|---------|-----------|
| JP | H10334952 A   |   | 12/1998 |           |
| JP | 2000021440 A  |   | 1/2000  |           |
| JP | 2000222660 A  | * | 8/2000  | G08B 23/00 |
| JP | 2000222660 A  |   | 8/2000  |           |
| JP | 2007185048 A  |   | 7/2007  |           |
| JP | 2010172143 A  |   | 8/2010  |           |

\* cited by examiner

ELECTRONIC DEVICE

CROSS REFERENCE TO RELATED APPLICATIONS

This application is a U.S. National Phase Application under 35 U.S.C. 371 of International Application No. PCT/JP2014/006411 filed on Dec. 24, 2014 and published in Japanese as WO 2015/104770 A1 on Jul. 16, 2015. This application is based on and claims the benefit of priority from Japanese Patent Application No. 2014-001627 filed on Jan. 8, 2014. The entire disclosures of all of the above applications are incorporated herein by reference.

TECHNICAL FIELD

The present disclosure relates to an electronic device that operates with power supplied from an external main battery and incorporates an auxiliary battery as a standby power supply.

BACKGROUND ART

A battery mounted in a vehicle has an output capability decreased in a low-temperature environment. Accordingly, a configuration for heating the battery using a heater has been proposed. For example, in Patent Literature 1, a comb-shaped electrode is formed on a flexible PET resin substrate, and a resin PTC heating element is applied and formed on the comb-shaped electrode, thus forming a sheet heating element. Further, the sheet heating element is wound around the periphery of four sides of a battery mounted in a vehicle, and current is conducted to the comb-shaped electrode, thus heating the battery.

PRIOR ART LITERATURE

Patent Literature

Patent Literature 1: JP H09-213459 A

SUMMARY OF INVENTION

In recent years, there have been cases where an emergency notification device for providing emergency notification at the time of an accident or the like is mounted in the vehicle. In order to be able to execute the notification even if the battery mounted in the vehicle is damaged, the emergency notification device includes a small battery as a standby power supply in the device. Such a battery as the standby power supply also has an output capability decreased in a low-temperature environment; therefore, it is desirable to adopt a configuration for heating it using a heater.

However, in the case of applying the same configuration as in Patent Literature 1 to the battery incorporated in the emergency notification device, for example, there is a possible configuration for covering the periphery of the battery with the sheet heating element. However, in this case, it is necessary to make an integrated configuration, that is, a module by fixing and packing the sheet heating element to the battery with tape or the like. Accordingly, when the battery needs to be replaced due to the end of battery life caused by deterioration over time, the sheet heating element is also replaced, which leads to wastefulness.

In Patent Literature 1, to conduct electricity to the comb-shaped electrode, battery connecting lead wires are connected to the automotive battery. Accordingly, if the above structure is applied to the battery as the standby power supply, power for heating has to be supplied from the battery, which increases battery consumption and therefore might make it difficult to act as the standby power supply.

Further, preferably, it can be checked whether or not the battery as the standby power supply can retain a desired output capability in a state where the vehicle is actually being driven. To do this, for example, there is a possible configuration for conducting a current to a test resistance element from the battery and referring to the terminal voltage thereof. In this case, the resistance element is also heated as a result, and if the resistance element is disposed on a circuit board side, the resistance element is provided individually from the heating element on a module side, which leads to a wasteful configuration in terms of size and cost. Further, the test resistance element is required to be designed to dissipate the generated heat and to be selected to have a margin for the rated power, which leads to complicated design.

The present disclosure has been made in view of the above circumstances, and it is an object thereof to provide an electronic device that can heat an auxiliary battery as a standby power supply and check a function of the auxiliary battery with a simpler configuration.

According to an aspect of the present disclosure, an electronic device includes a heating element for heating an auxiliary battery incorporated as a standby power supply for a main battery, and also includes first and second power supply path formation units for forming first and second power supply paths for supplying power from the main battery and the auxiliary battery to the heating element, respectively. A control circuit controls the first and second power supply path formation units to form the first or second power supply path so as to energize the heating element.

That is, by forming the first power supply path and supplying power from the main battery to the heating element, it is possible to heat the auxiliary battery without consuming the auxiliary battery by the heating element, and by forming the second power supply path and supplying power from the auxiliary battery to the heating element, it is also possible to check the function of the auxiliary battery. Therefore, it is possible to heat the auxiliary battery and check the function of the auxiliary battery with an extremely simple configuration.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS (First Embodiment)

Figure 2:
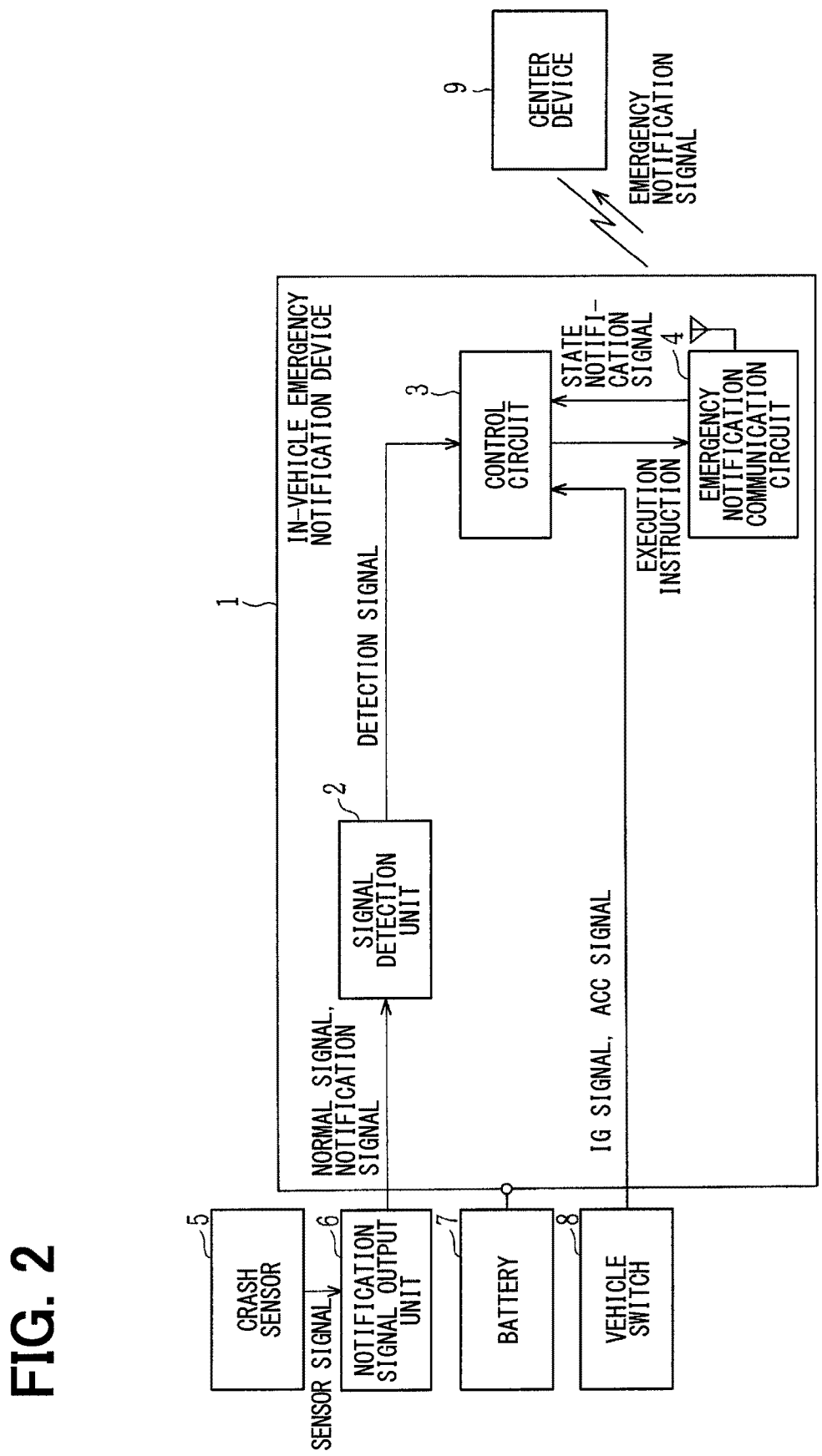
FIG. 2 is a functional block diagram schematically showing the entire configuration of the in-vehicle emergency notification device according to the first embodiment.

As shown in FIG. 2, an in-vehicle emergency notification device 1 (electronic device) is mountable in a vehicle, and includes a signal detection unit 2, a control circuit 3 (control unit), and an emergency notification communication circuit 4. The term "mountable in the vehicle" includes a mode of being fixedly mounted in the vehicle and a mode of being detachably mounted in the vehicle.

A crash sensor 5 is provided at a predetermined location such as a front portion of a vehicle body, and outputs a sensor signal to a notification signal output unit 6 in response to a vehicle crash. The notification signal output unit 6 is, for example, an airbag ECU (Electronic Control Unit), and outputs a normal signal to the signal detection unit 2 by means of a pulse signal during no input of the sensor signal from the crash sensor 5. On the other hand, when the sensor signal is inputted from the crash sensor 5, the notification signal output unit 6 outputs a notification signal different from the normal signal to the signal detection unit 2 by means of a pulse signal, and controls the deployment of an airbag (not shown) to protect a driver and a passenger from a crash impact.

The signal detection unit 2 detects the pulse signal inputted from the notification signal output unit 6, detects the interval (high/low pulse duration) between edges between the high and low levels of the pulse signal, and outputs a detection signal capable of identifying the detection result to the control circuit 3. A main battery 7, which is a battery mounted in the vehicle, supplies operating power to the in-vehicle emergency notification device 1. The configuration of a power supply system in the in-vehicle emergency notification device 1 will be described later with reference to FIG. 1.

The control circuit 3 is configured mainly with a microcomputer composed of a CPU, a ROM, a RAM, and the like, and executes an operating program stored in the ROM to control the overall operation of the in-vehicle emergency notification device 1. The control circuit 3 monitors the input of an IG signal and an ACC signal from a vehicle switch 8 in a low power consumption state when IG (ignition) and ACC (accessory) are in an off state, and determines the input of the IG signal and the ACC signal, thereby determining switching from the off state of IG and ACC to the on state.

When the detection signal is inputted from the signal detection unit 2, the control circuit 3 analyzes the detection signal and thereby determines whether the pulse signal outputted from the notification signal output unit 6 is the notification signal or the normal signal, that is, the vehicle has crashed or not. If the control circuit 3 determines that the pulse signal outputted from the notification signal output unit 6 is the notification signal, that is, the vehicle has crashed, the control circuit 3 outputs an instruction for executing an emergency notification to the emergency notification communication circuit 4.

The emergency notification communication circuit 4 has a telephone function (an outgoing call function of making an outgoing call to a communication network, an incoming call function of receiving an incoming call from the communication network, a voice call function of performing a voice call, a data communication function of performing data communication, and the like), and provides an emergency notification using the telephone function when the instruction for executing the emergency notification is inputted from the control circuit 3. More specifically, the emergency notification communication circuit 4 transmits an emergency notification signal including the current position of the vehicle identified by a current position identification unit (not shown) using e.g. a GPS (Global Positioning System) and vehicle identification information (a vehicle number, the user of the vehicle, etc.) capable of identifying the vehicle and registered beforehand to a center device 9 of an outside agency registered beforehand via a wide area communication network (including a mobile communication network and a fixed communication network), thus providing the emergency notification.

When the center device 9 receives the emergency notification signal transmitted from the in-vehicle emergency notification device 1 via the wide area communication network, the center device 9 informs the occurrence of the emergency notification to an operator or the like of the outside agency. Upon receipt of the rescue request, the operator provides necessary assistance. There are various modes of assistance between the operator and the user (driver). For example, after the in-vehicle emergency notification device 1 makes an outgoing call (call) to the center device 9 to connect a telephone line and the in-vehicle emergency notification device 1 transmits the current position of the vehicle and the vehicle identification information to the center device 9, the telephone line is temporarily disconnected, the center device 9 makes an outgoing call (callback) to the in-vehicle emergency notification device 1 to reconnect the telephone line, and a voice call may be performed. Alternatively, switching from data communication to a voice call may be performed with the telephone line kept connected without disconnection.

When the emergency notification communication circuit 4 starts the emergency notification after the instruction for executing the emergency notification is inputted from the control circuit 3, the emergency notification communication circuit 4 outputs a state notification signal capable of identifying which operating state the emergency notification communication circuit is in, the data communication, the voice call, or standby for an outgoing/incoming call and whether or not the emergency notification has ended to the control circuit 3. That is, the control circuit 3 analyzes the state notification signal inputted from the emergency notification communication circuit 4, and can thereby identify which operating state the emergency notification communication circuit 4 is in, the data communication, the voice call, or standby and whether or not the emergency notification has ended.

The emergency notification communication circuit 4 may autonomously and periodically output the state notification signal to the control circuit 3, or may output the state notification signal to the control circuit 3 in response to periodical input of a state inquiry signal from the control circuit 3. Alternatively, the emergency notification communication circuit 4 may output the state notification signal to the control circuit 3 at the time of switching the operating states.

Figure 1:
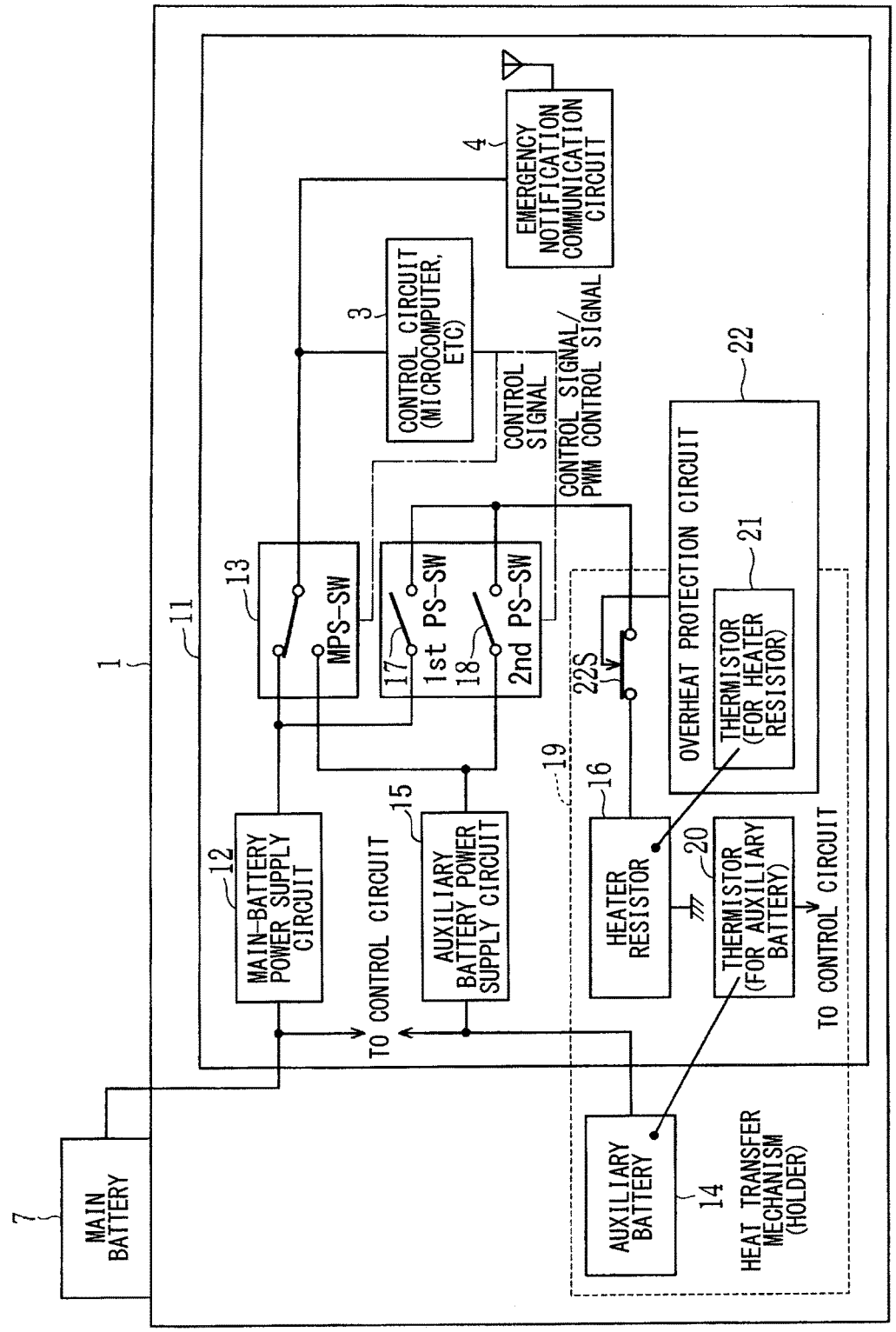
FIG. 1 is a functional block diagram showing a partial configuration of an in-vehicle emergency notification device according to a first embodiment of the present disclosure.

In FIG. 1, components constituting the in-vehicle emergency notification device 1 are mounted on a printed board 11 (circuit board). The power supplied from the main battery 7 is stepped down by a main-battery power supply circuit 12 to a lower voltage, which is supplied through a main power supply switch 13 (MPS-SW) to the control circuit 3 and the emergency notification communication circuit 4. An auxiliary battery 14 is a backup power supply for the main battery 7. In terms of being incorporated into the in-vehicle emergency notification device 1, it is desirable that the auxiliary battery 14 is miniaturized and a smaller number of cells are preferably used. For example, a lithium-ion battery has a 4[V]×1 cell, a nickel-hydrogen battery has 1.2[V]×3 or 4 cells, and a lithium manganese dioxide battery has a 3[V]×1 cell. In general, the auxiliary battery 14 has a characteristic of increasing an internal resistance in a low-temperature environment of the vehicle or due to deterioration with the lapse of use years, thereby decreasing a power supply voltage. The auxiliary battery 14 is incorporated in the in-vehicle emergency notification device 1 with a structure that enables a worker to replace the auxiliary battery.

An auxiliary-battery power supply circuit 15 is connected to the auxiliary battery 14, and converts (boosts) an auxiliary power supply voltage supplied from the auxiliary battery 14. That is, the auxiliary-battery power supply circuit 15 converts the auxiliary power supply voltage supplied from the auxiliary battery 14 to generate a boosted voltage of 4.8 V, and supplies the generated boosted voltage through the main power supply switch 13 to the control circuit 3, the emergency notification communication circuit 4, and the like. That is, the main power supply switch 13 is a 2-input/1-output multiplexer, and the switching thereof is controlled by the control circuit 3. The voltage of the auxiliary-battery power supply circuit 15 is within the range of the operating voltage (e.g., 3 to 5 V) of each functional block.

A heater resistor 16 (heating element) is disposed near the auxiliary battery 14. Power is supplied to the heater resistor 16 through the main-battery power supply circuit 12 and a first power supply switch 17 (first power supply path formation unit, 1$^{st}$ PS-SW) or through the auxiliary-battery power supply circuit 15 and a second power supply switch 18 (second power supply path formation unit, 2$^{nd}$ PS-SW). The heater resistor 16 is used to heat the auxiliary battery 14 when the vehicle is in a low-temperature environment or to check the function of the auxiliary battery 14. Heat generated by the heater resistor 16 is transferred through a heat transfer mechanism 19 to the auxiliary battery 14.

Further, a thermistor 20 (temperature detection unit) for temperature detection is disposed near the auxiliary battery 14, and a thermistor 21 for temperature detection is disposed near the heater resistor 16. A sensor signal of the thermistor 20 is inputted to the control circuit 3. The thermistor 21 is incorporated in an overheat protection circuit 22 which operates so as to cut off a power supply path to the heater resistor 16 when the heater resistor 16 is overheated. The overheat protection circuit 22 performs an overheat protection operation by opening a normally closed switch 22S disposed between the first and second power supply switches 17, 18 and the heater resistor 16.

The main power supply switch 13 and the first and second power supply switches 17, 18 are configured with transistors (semiconductor switches) such as MOSFETs. The input terminal of the control circuit 3 is connected to the positive terminals of the main battery 7 and the auxiliary battery 14, and these power supply voltages undergo A/D conversion (after voltage division as necessary) to be read.

Figure 7A:
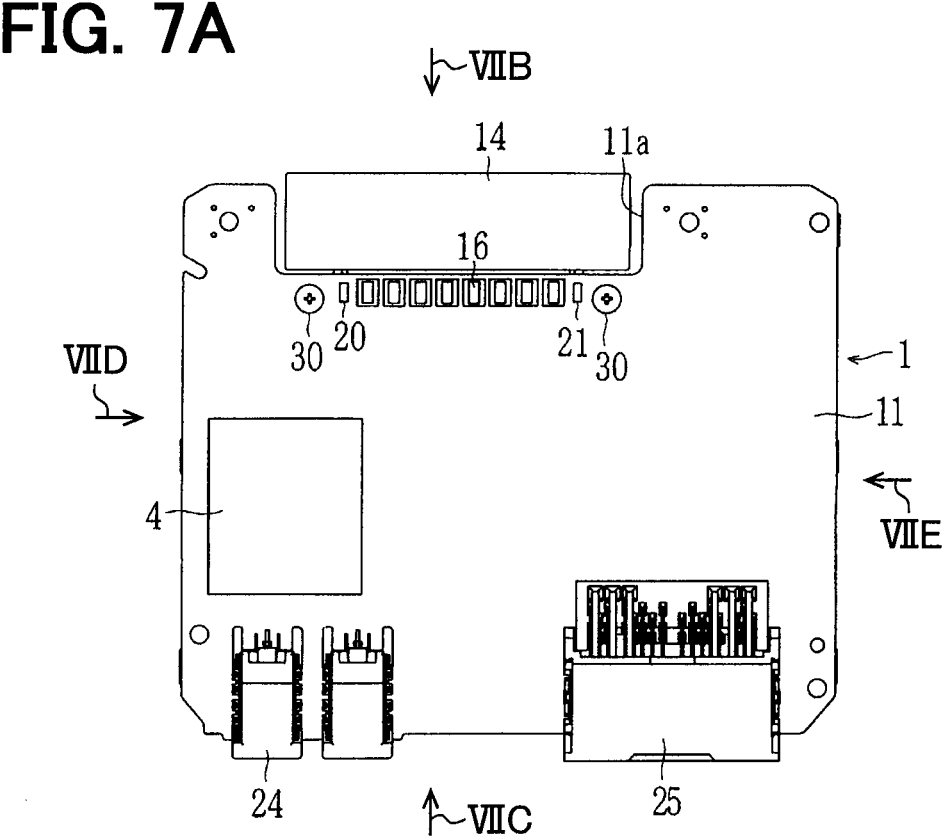
FIG. 7A is a plan view of a printed board for illustrating the state of mounting components constituting the in-vehicle emergency notification device on the printed board.
Figure 7B:
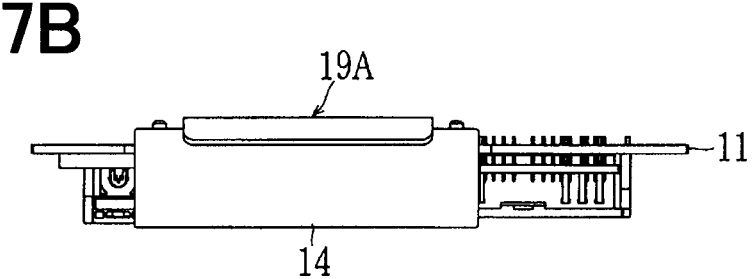
FIG. 7B is a back view of the printed board shown in FIG. 7A as viewed from the direction of an arrow VIIB.
Figure 7C:
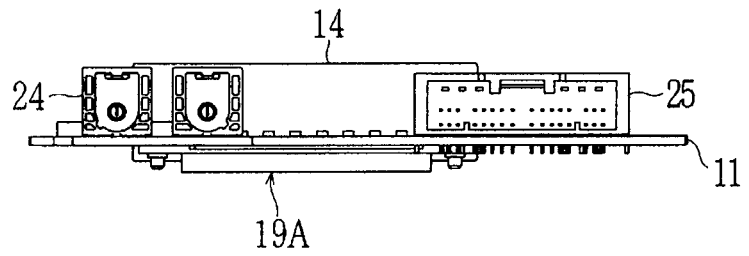
FIG. 7C is a front view of the printed board shown in FIG. 7A as viewed from the direction of an arrow VIIC.
Figure 7D:
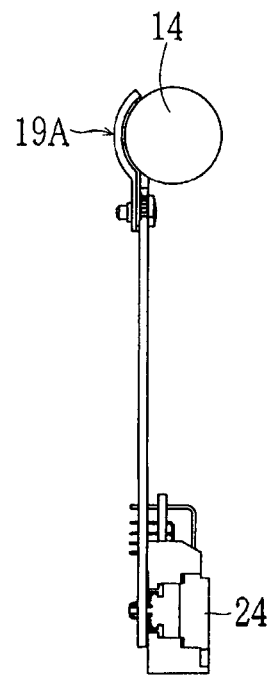
FIG. 7D is a side view of the printed board shown in FIG. 7A as viewed from the direction of an arrow VIID.
Figure 7E:
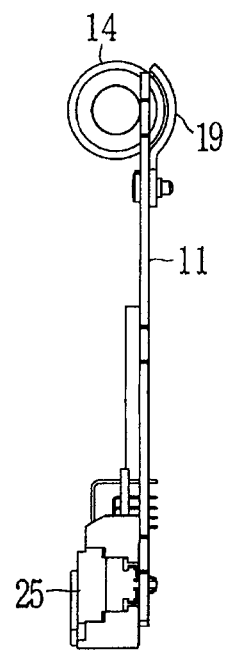
FIG. 7E is a side view of the printed board shown in FIG. 7A as viewed from the direction of an arrow VIIE.

As shown in FIGS. 7A to 7E and FIGS. 8A and 8B, the printed board 11 substantially has a rectangular shape, and a landscape-oriented rectangular cutout 11a is formed at the back (the upper side of FIG. 7A). A battery holder 19A made of metal (e.g., aluminum) constituting the heat transfer mechanism 19 is mounted to the cutout 11a. The auxiliary battery 14 is cylindrical, and the battery holder 19A has a holding portion 19Aa having a curved surface along the arc of the auxiliary battery 14 so as to hold a part of the peripheral surface of the cylinder along the longitudinal direction. The battery holder 19A has a landscape-oriented rectangular fixing portion 19Ab in continuation with the holding portion 19Aa, the fixing portion 19Ab is in contact with the rear surface of the printed board 11, and both ends of the fixing portion 19Ab are fixed by screws 30 from the front surface of the printed board 11 (see FIGS. 7A, 8B).

Figure 8A:
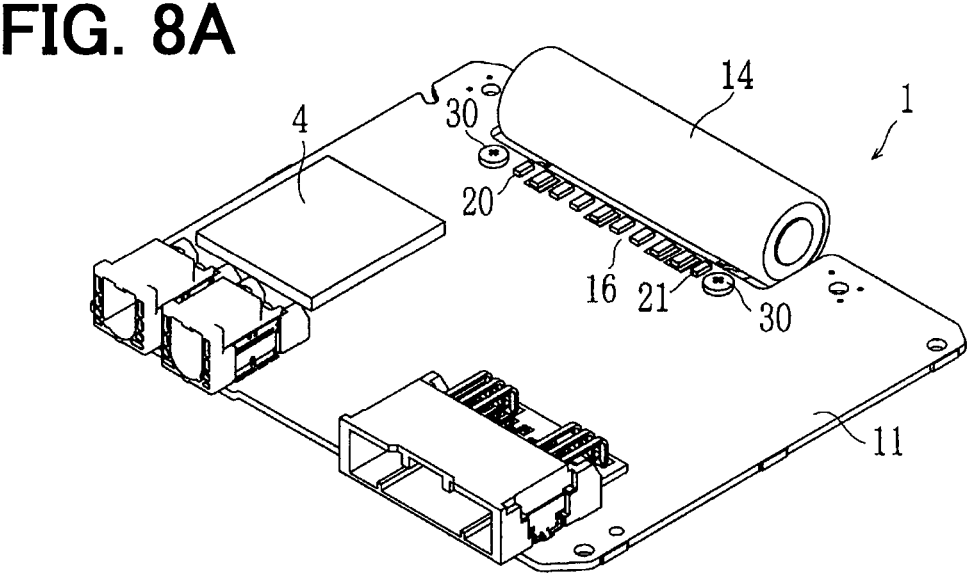
FIG. 8A is a perspective view of the printed board shown in FIG. 7A.
Figure 8B:
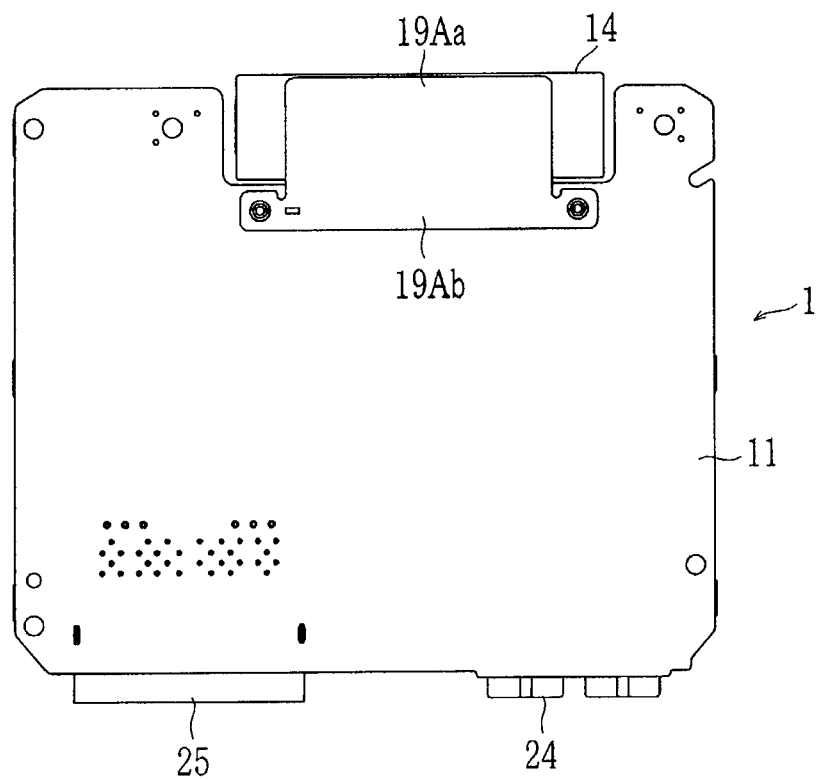
FIG. 8B is a bottom view of the printed board shown in FIG. 7A.
Figure 9:
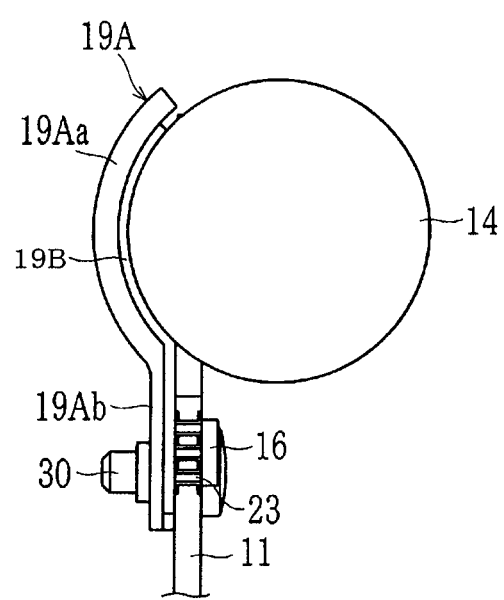
FIG. 9 is a partial enlarged view of the printed board shown in FIG. 7D.

As shown in FIGS. 7A, 8A, a plurality of heater resistors 16 composed of chip resistors are arranged in the longitudinal direction of the cutout 11a on the front surface of the printed board 11 corresponding to the position of the fixing portion 19Ab. As shown in FIG. 9, a heat transfer sheet 19B constituting the heat transfer mechanism 19 is interposed between the battery holder 19A and the auxiliary battery 14 and the printed board 11. The heat transfer sheet 19B is, for example, a silicon-based elastic material, and is in close contact with the battery holder 19A, the auxiliary battery 14, and the printed board 11. The auxiliary battery 14 is pressed against the heat transfer sheet 19B on the battery holder 19A by a lid of an outer case (not shown) to be held.

As shown in FIG. 9, a through hole 23 made with copper foil is formed between the heater resistor 16 disposed on the front surface of the printed board 11 and the rear surface of the printed board 11, that is, a portion where the fixing portion 19Ab of the battery holder 19A is in contact through the heat transfer sheet 19B. With this, when the heater resistor 16 is energized and heat is generated, the heat is conducted to the rear surface of the printed board 11 through the through hole 23, and further conducted to the heat transfer sheet 19B, the battery holder 19A, and the auxiliary battery 14. In FIG. 9, only the portion showing the through hole 23 is shown in cross section.

As shown in FIGS. 7A, 8A, the thermistors 20, 21 are disposed on both sides of the heater resistor 16, respectively. The thermistors 20, 21 are positioned so as to equally detect the heat generated by the heater resistor 16. Since the thermistor 20 is provided in order for the control circuit 3 to detect the temperature of the auxiliary battery 14, correlation data between the temperature detected by the thermistor 20 in this position and the actual temperature of the auxiliary battery 14 is obtained beforehand so that the control circuit 3 detects the temperature.

In addition, the module of the emergency notification communication circuit 4, a connector 24 for connecting an antenna to the emergency notification communication circuit 4, an interface connector 25 through which the control circuit 3 communicates with the vehicle, and the like are disposed on the printed board 11.

Figure 3:
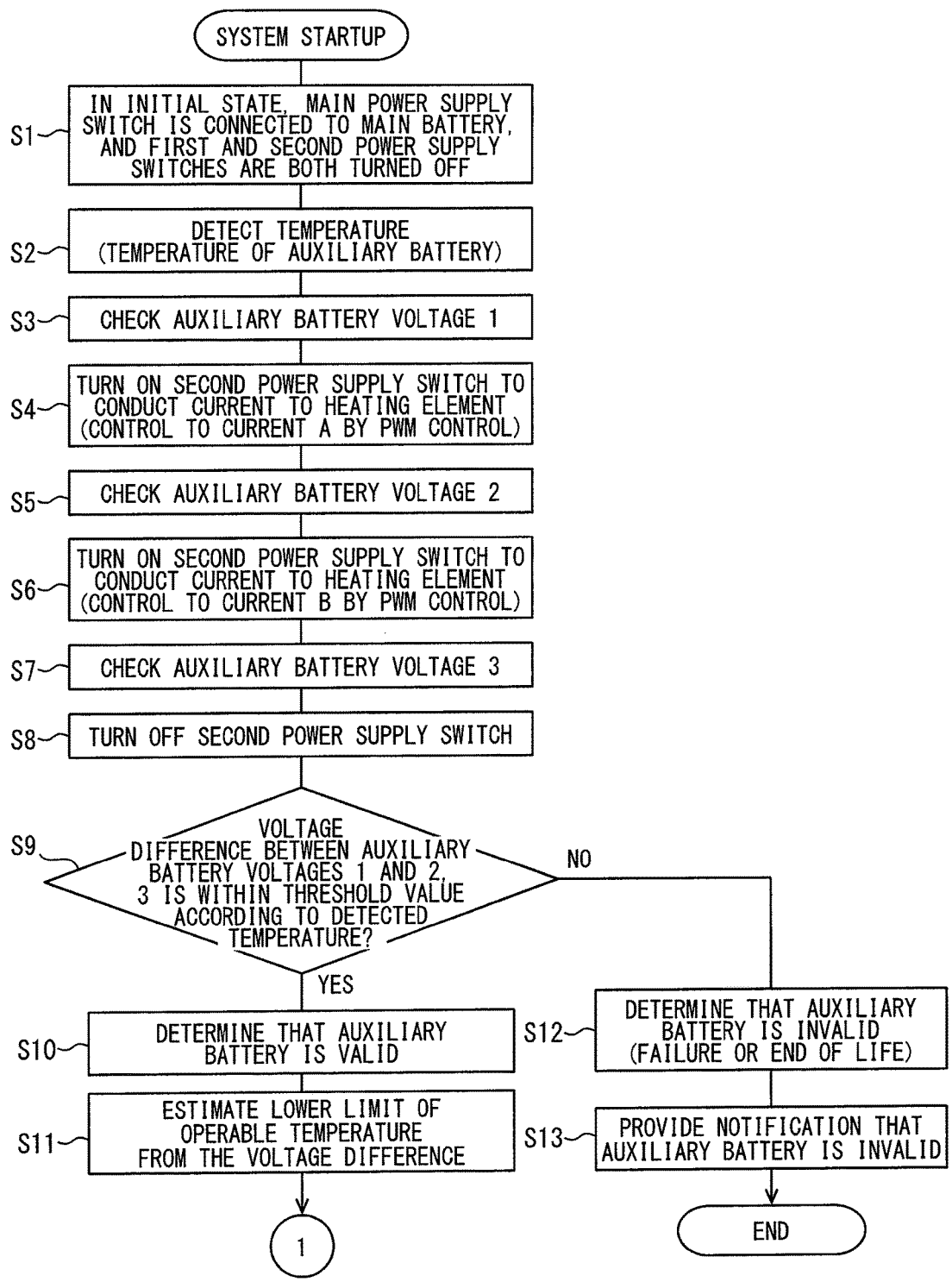
FIG. 3 is a flowchart showing contents of a control.
Figure 4:
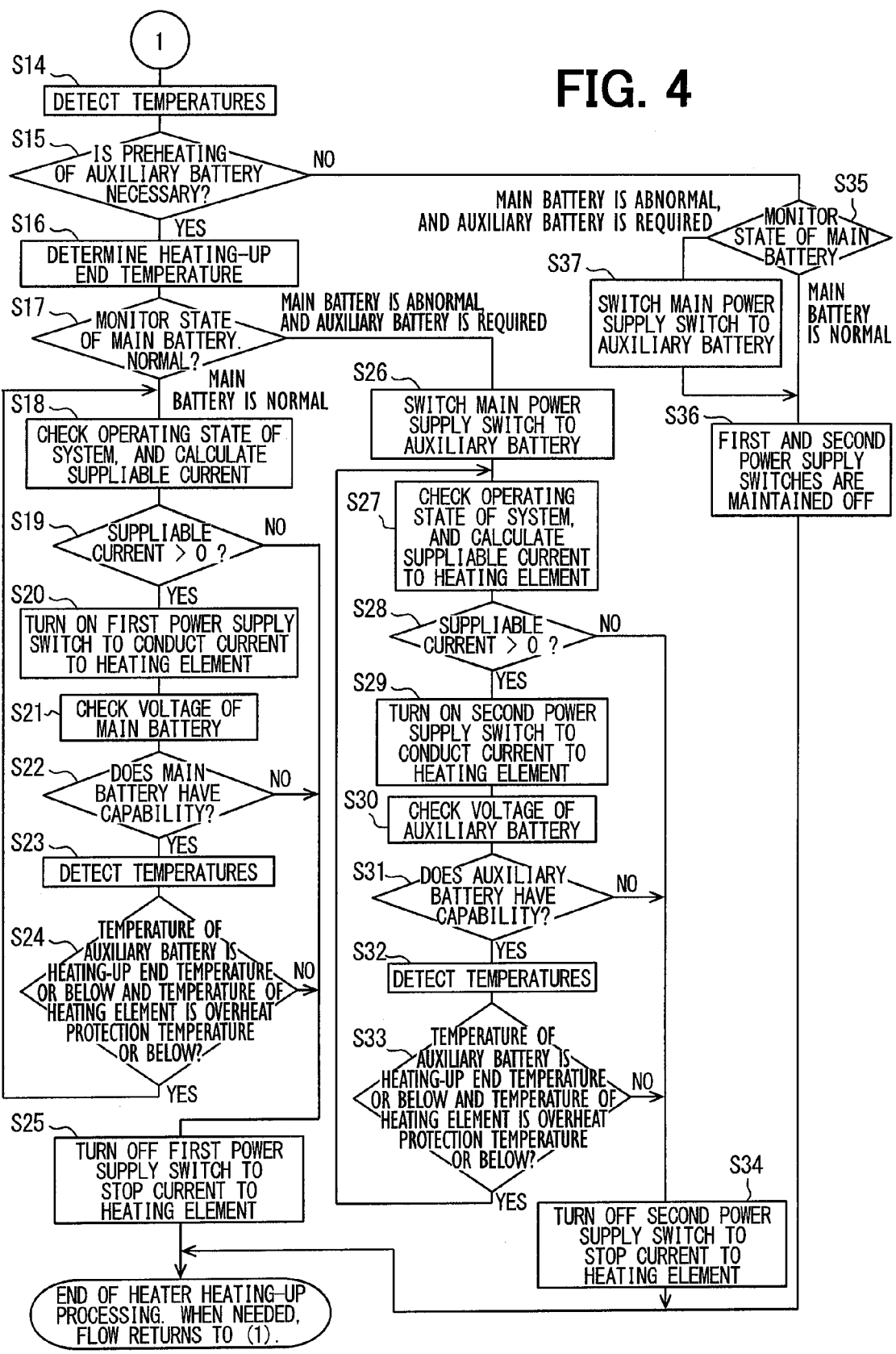
FIG. 4 is a flowchart showing the contents of the control following FIG. 3.

Next, the operation of the present embodiment will be described with reference to FIGS. 3 to 5B. In FIG. 3, in an initial state, the main power supply switch 13 is connected to the main battery 7, and the first and second power supply switches 17, 18 are both turned off (S1). The control circuit 3 detects the temperature of the auxiliary battery 14 through the thermistor 20 (S2), and then checks (1) the voltage of the auxiliary battery 14 (S3).

Then, the control circuit 3 performs on/off control of the second power supply switch 18 with a PWM signal so that the current flowing to the heater resistor 16 by the power from the auxiliary battery 14 becomes a current value A (S4). In this state, the control circuit 3 checks (2) the voltage of the auxiliary battery 14 (S5). Then, the control circuit 3 performs on/off control of the second power supply switch 18 with the PWM signal so that the current flowing to the heater resistor 16 becomes a current value B (>A) (S6), and checks (3) the voltage of the auxiliary battery 14 in this state (S7). Then, the second power supply switch 18 is turned off (S8).

Then, the control circuit 3 determines whether or not the difference between the voltages of the auxiliary battery 14 detected in steps S3, S5, S7 is within a threshold value according to the temperature of the auxiliary battery 14 detected in step S2 (S9). If it is within the threshold value (YES), the control circuit 3 determines that the auxiliary battery 14 is valid (function is normal) (S10), and executes step S11 and the subsequent steps. On the other hand, if it is not within the threshold value (NO), the control circuit 3 determines that the auxiliary battery 14 is invalid (failure or end of life) (S12), provides notification that the auxiliary battery 14 is invalid (S13), and ends the processing.

As for the notification, if the in-vehicle emergency notification device 1 has a warning indicator (such as an LED lamp), the indicator is lit for indication. Alternatively, if the in-vehicle emergency notification device 1 is connected to a body ECU (Electronic Control Unit) or the like of the vehicle through an in-vehicle LAN or the like, a message signal may be transmitted to the body ECU and displayed on an instrument panel of the vehicle.

The relationship between the detected temperature of the auxiliary battery 14 and the difference between the detected voltages in step S9 will be described with reference to FIGS. 5A, 5B. The current A shown in FIG. 5A and the current B shown in FIG. 5B have the relationship of (A<B). Determination lines set at the respective current values are based on the temperature characteristics of the auxiliary battery 14. For example, in a low-temperature region below −10° C., the amount of voltage drop increases sharply, which leads to the possibility of not being able to supply enough power.

Figure 5A:
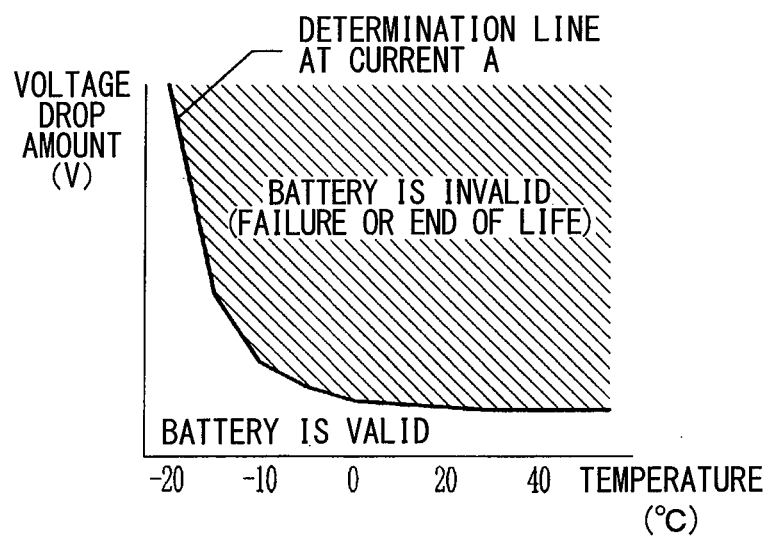
FIG. 5A is a diagram showing the relationship between the temperature and the voltage drop amount of an auxiliary battery.
Figure 5B:
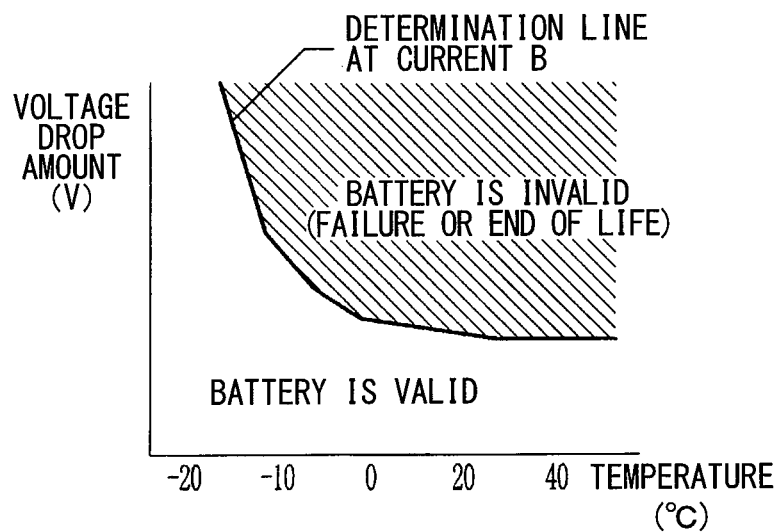
FIG. 5B is a diagram showing the relationship between the temperature and the voltage drop amount of the auxiliary battery.

At the same temperature, the amount of voltage drop of the auxiliary battery 14 increases with increasing output current; therefore, it is preferable to set different determination lines based on a plurality of current values, as shown in FIGS. 5A, 5B. For example, at low temperatures, even if the output current is small, the amount of voltage drop is large, so that there is no problem with the determination accuracy. However, at normal or high temperatures, the amount of voltage drop is not large unless the output current is large to some extent. Accordingly, in the latter case, the amount of voltage drop at a large output current is used for determination, thus maintaining the determination accuracy. As a matter of course, a determination line may be set at one current value.

Further, in step S9, it is not necessary to perform the on/off control of the second power supply switch 18 with the PWM signal at the time of referring to the amount of voltage change for the abnormality determination of the auxiliary battery 14. For example, the amount of drop of the voltage of the auxiliary battery 14 when the second power supply switch is (continuously) turned on from the voltage of the auxiliary battery 14 when the second power supply switch is turned off may be used for the abnormality determination.

On the other hand, if the auxiliary battery 14 is valid, the lower limit of the operable temperature of the auxiliary battery 14 is estimated from the voltage difference obtained in step S9 (S11). Then, the temperature of the auxiliary battery 14 and the temperature of the heater resistor 16 through the thermistor 21 are detected (S14), and in step S15, it is determined whether or not the preheating of the auxiliary battery 14 is necessary. The determination conditions are as follows:

(temperature of the auxiliary battery 14)≤ (operable temperature); and (temperature of the heater resistor 16)≤ (overheat protection temperature).

If the conditions are satisfied, it is determined that the preheating of the auxiliary battery 14 is necessary (YES).

Then, the flow moves to step S16, where a heating-up end temperature of the auxiliary battery 14 is determined from the operable temperature estimated in step S11. Then, the voltage of the main battery 7 is checked, and it is determined whether or not the voltage is normal (S17). If it is normal (YES), steps S18 to S25 are executed. If it is abnormal (NO), steps S26 to S34 are executed.

The relationship between the voltage difference and the lower limit of the operable temperature in step S11 and the relationship of the heating-up end temperature in step S16 will be described. Assume that the amount of voltage drop at some measurement is within the valid region of the auxiliary battery 14 as shown by a dot in FIG. 6. However, since the amount of voltage drop exceeds the operating limit of a system shown by a dashed line in FIG. 6, it is not possible to use the auxiliary battery 14 as it is. (In FIG. 6, the "operating limit" is assumed to be constant independently of the temperature. To be precise, the amount of voltage drop corresponding to "the operating limit" changes in accordance with the voltage of the auxiliary battery 14.)

Figure 6:
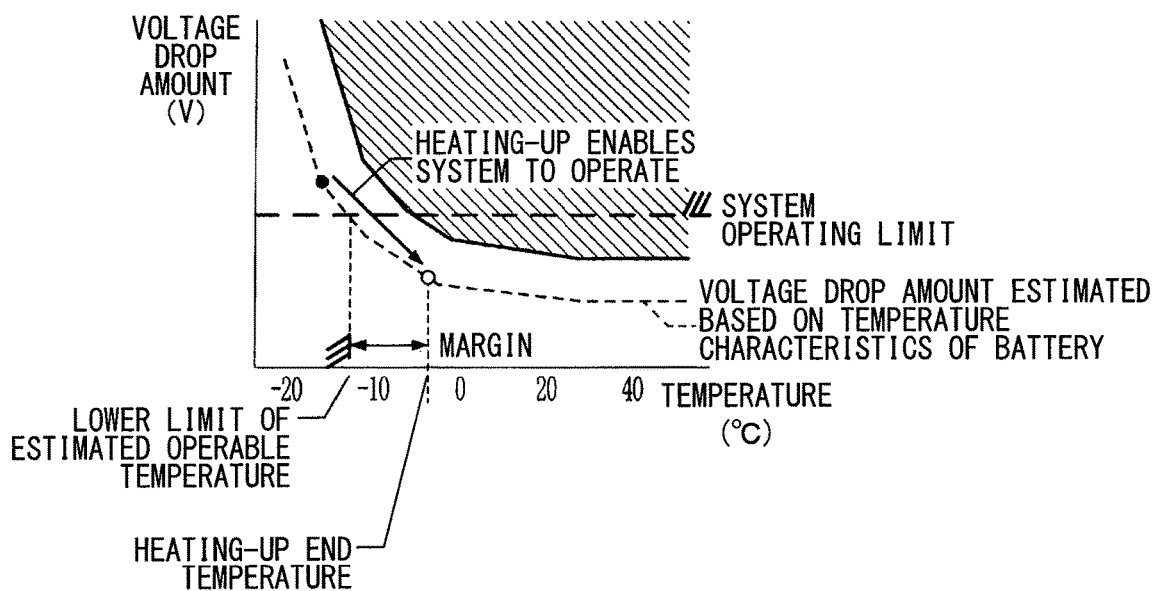
FIG. 6 is a diagram for explaining the relationship between the voltage drop amount of the auxiliary battery and the lower limit of an operable temperature and a heating-up end temperature.

As shown by a (shorter) dashed line in FIG. 6, in consideration of the temperature characteristics of the auxiliary battery 14, the characteristic curve of the temperature to the amount of voltage drop is estimated. The intersection point between the characteristic curve and the system operating limit line corresponds to "the lower limit of the operable temperature". "The heating-up end temperature" in step S16 (void dot in FIG. 6) is obtained by adding a margin to the lower limit. In actual processing, the internal resistance value of the auxiliary battery 14 is calculated based on the amount of voltage drop and the current values A and B, and based on the temperature characteristics of the internal resistance, the validity/invalidity is determined, and the estimated amount of voltage drop and the lower limit of the operable temperature are calculated.

In step S18, the operating state of the system (in-vehicle emergency notification device 1) is checked, and a suppliable current to the heater resistor 16 is calculated. If the suppliable current exceeds 0 A (S19: YES), the current is conducted to the heater resistor 16 via the first power supply switch 17. Here, control is also performed by turning on/off the first power supply switch 17 with the PWM signal so that the current conducted to the heater resistor 16 does not exceed the suppliable current (S20).

Then, the voltage of the main battery 7 is checked (S21), and it is determined whether or not the main battery 7 has a current supply capability (S22). If the main battery 7 has the current supply capability (YES), the temperature of the auxiliary battery 14 and the temperature of the heater resistor 16 are detected (S23), and the following conditions are determined (S24).

(temperature of the auxiliary battery 14)≤ (heating-up end temperature); and (temperature of the heater resistor 16)≤ (overheat protection temperature).

If YES in step S24, the flow returns to step S18, and the above steps are repeated. If NO in any of the steps S19, S22, S24, the first power supply switch 17 is turned off to stop the current to the heater resistor 16 (S25). Then, the flow returns to step S14 as necessary.

On the other hand, if NO in step S17, the main power supply switch 13 is switched to the auxiliary battery 14 (S26). This processing may be controlled by hardware. Then, the same processing and determination as steps S18, S19 are performed (S27, S28). If the suppliable current exceeds 0 A (S28: YES), the current is conducted to the heater resistor 16 via the second power supply switch 18. That is, control is performed by turning on/off the second power supply switch 18 with the PWM signal so that the current conducted to the heater resistor 16 does not exceed the suppliable current (S29).

Then, the voltage of the auxiliary battery 14 is checked (S30), and it is determined whether or not the auxiliary battery 14 has a current supply capability (S31). If the auxiliary battery 14 has the current supply capability (YES), the same processing and determination as steps S23, S24 are performed (S32, S33). If YES in step S33, the flow returns to step S27, and the above steps are repeated. If NO in any of the steps S28, S31, S33, the second power supply switch 18 is turned off to stop the current to the heater resistor 16 (S34). Then, the flow returns to step S14 as necessary.

If NO in step S15 (the preheating of the auxiliary battery 14 is not necessary), the state of the main battery 7 is monitored (S35) as in step S14. If it is normal (YES), the first and second power supply switches 17, 18 are maintained off (S36). On the other hand, if it is abnormal (NO), the same processing as step S26 is performed (S37), and the flow moves to step S36.

As described above, the present embodiment is provided with the heater resistor 16 for heating the auxiliary battery 14 incorporated in the in-vehicle emergency notification device 1 as the standby power supply for the main battery 7, and is also provided with the first and second power supply switches 17, 18 for forming the first and second power supply paths for supplying power from the main battery 7 and the auxiliary battery 14 to the heater resistor 16, respectively. The control circuit 3 controls the first and second power supply switches 17, 18 to form the power supply paths so as to conduct the current to the heater resistor 16. With this, by closing the first power supply switch 17 and supplying power from the main battery 7 to the heater resistor 16, it is possible to heat the auxiliary battery 14 by the heater resistor 16 without consuming the auxiliary battery 14. By closing the second power supply switch 18 and supplying power from the auxiliary battery 14 to the heater resistor 16, it is also possible to check the function of the auxiliary battery 14. Therefore, it is possible to heat the auxiliary battery 14 and check the function of the auxiliary battery 14 with an extremely simple configuration.

Further, the temperature of the auxiliary battery 14 is detected by the thermistor 20, and the control circuit 3 monitors the power supply state of the main battery 7. Only when the temperature of the auxiliary battery 14 falls to the operable temperature or below, the control circuit 3 closes the first power supply switch 17 or the second power supply switch 18 to conduct the current to the heater resistor 16 so as to heat the auxiliary battery 14, which can restrict the auxiliary battery 14 from unnecessary heat stress.

Further, when the temperature of the auxiliary battery 14 falls to the operable temperature or below, and when power supply from the main battery 7 is impossible (by losing the main battery 7 due to a vehicle crash or the like), the control circuit 3 closes the second power supply switch 18 so as to conduct the current to the heater resistor 16. In this case, by conducting the current to the heater resistor 16 from the auxiliary battery 14, the temperature of the auxiliary battery 14 can be increased so as to exceed the operable temperature. Therefore, even if the main battery 7 is lost due to a vehicle crash while the heating of the auxiliary battery 14 by the power supply from the main battery 7 is insufficient, self-heating by the auxiliary battery 14 enables an emergency notification.

Further, after the detection of the temperature of the auxiliary battery 14, the control circuit 3 determines the operable temperature, based on the amount of voltage drop (voltage change) of the auxiliary battery 14 detected when the amount of current flowing to the heater resistor 16 from the auxiliary battery 14 is changed in a plurality of levels (A, B). Thereby, for example as shown in FIG. 6, it is possible to determine the lower limit of the operable temperature based on the amount of voltage drop as the operating limit of the applied system. Further, the control circuit 3 can appropriately determine the heating-up end temperature of the auxiliary battery 14 by adding a margin to the lower limit of the operable temperature.

Moreover, if the amount of voltage drop of the auxiliary battery 14 with respect to the temperature of the auxiliary battery 14 exceeds the predetermined threshold value, the control circuit 3 determines that the auxiliary battery 14 is abnormal or has reached the end of life. Therefore, it is possible to appropriately determine that the auxiliary battery 14 is abnormal or has reached the end of life, based on the magnitude of the amount of voltage drop. Further, when the temperature of the auxiliary battery 14 falls to the operable temperature or below, the control circuit 3 predicts power necessary for operation by referring to the terminal voltages of the main battery 7 and the auxiliary battery 14. If the control circuit 3 determines that the supply of the power becomes impossible by conducting the current to the heater resistor 16, the control circuit 3 stops to conduct the current to the heater resistor 16. Therefore, heating the auxiliary battery 14 beyond the limit can be avoided.

In addition, the control circuit 3 determines the output capacity of the auxiliary battery 14, based on the state of current conduction to the heater resistor 16. More specifically, the control circuit 3 determines the output capacity, by referring to the terminal voltage of the auxiliary battery 14. Therefore, it is possible to simultaneously determine whether the power supply capacity of the auxiliary battery 14 is secured, at the time of heating the auxiliary battery 14 by conducting the current to the heater resistor 16.

(Second Embodiment)

Figure 10:
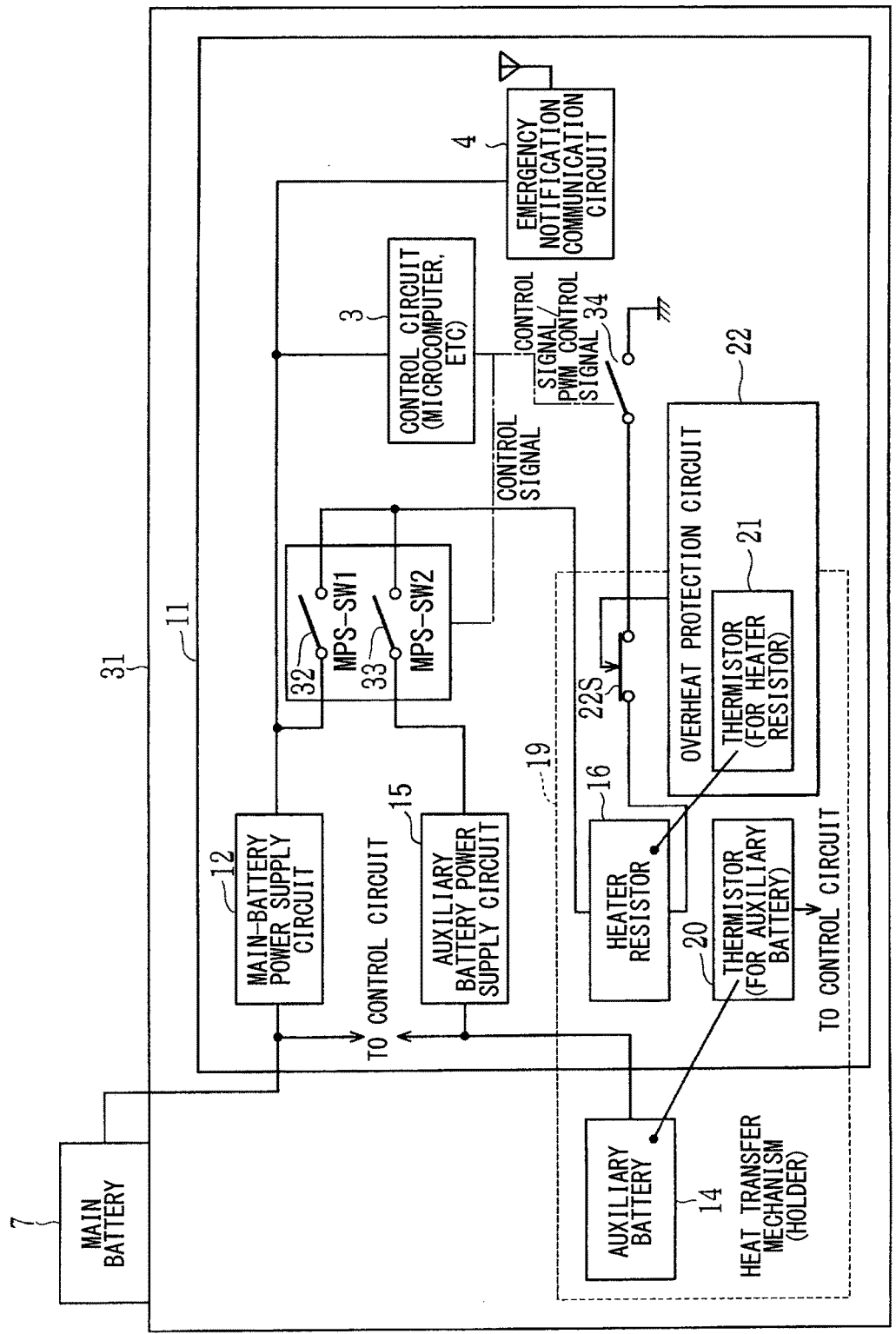
FIG. 10 is a functional block diagram showing a partial configuration of an in-vehicle emergency notification device according to a second embodiment of the present disclosure.
Figure 11:
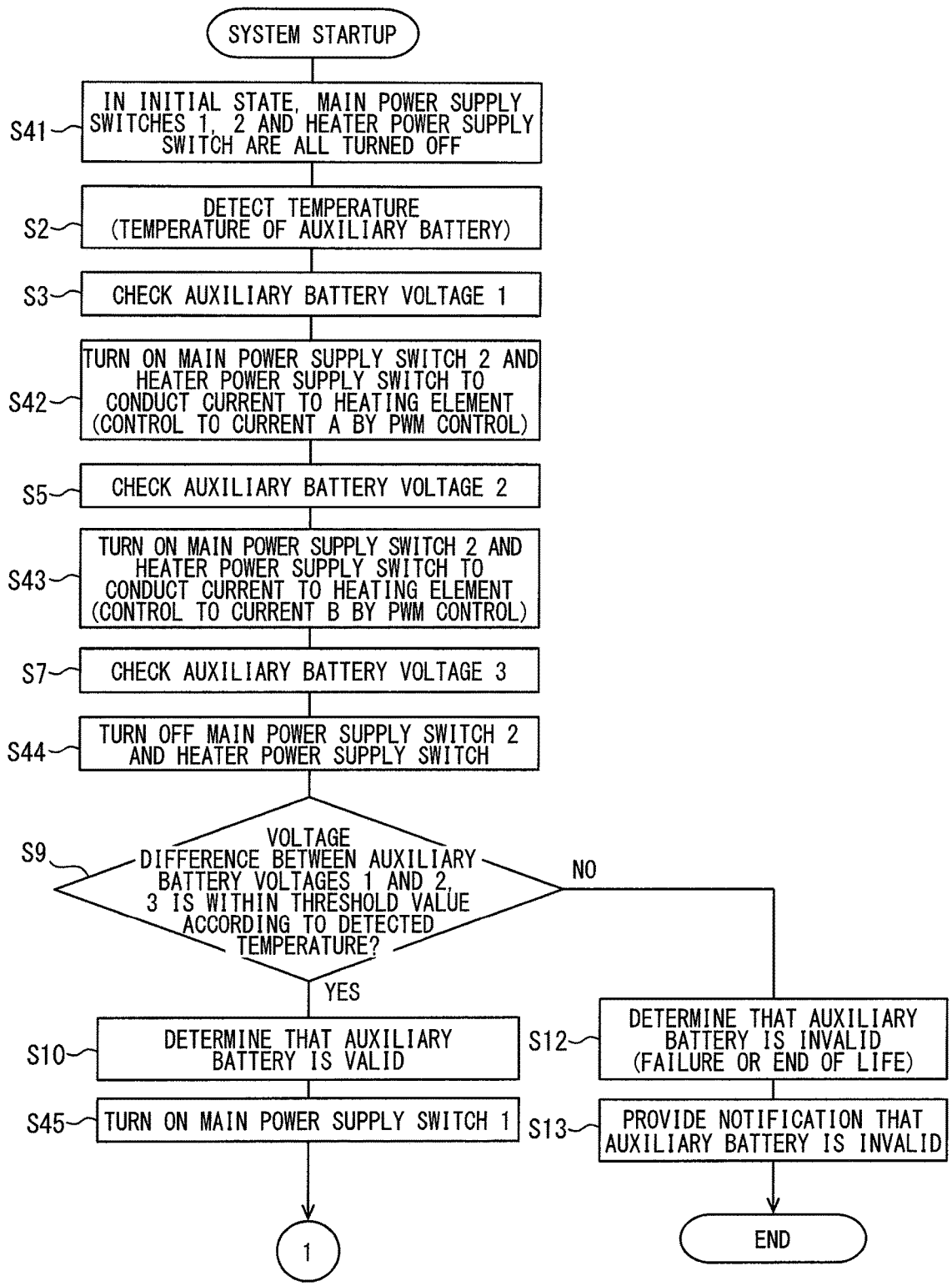
FIG. 11 is a flowchart showing contents of a control.
Figure 12:
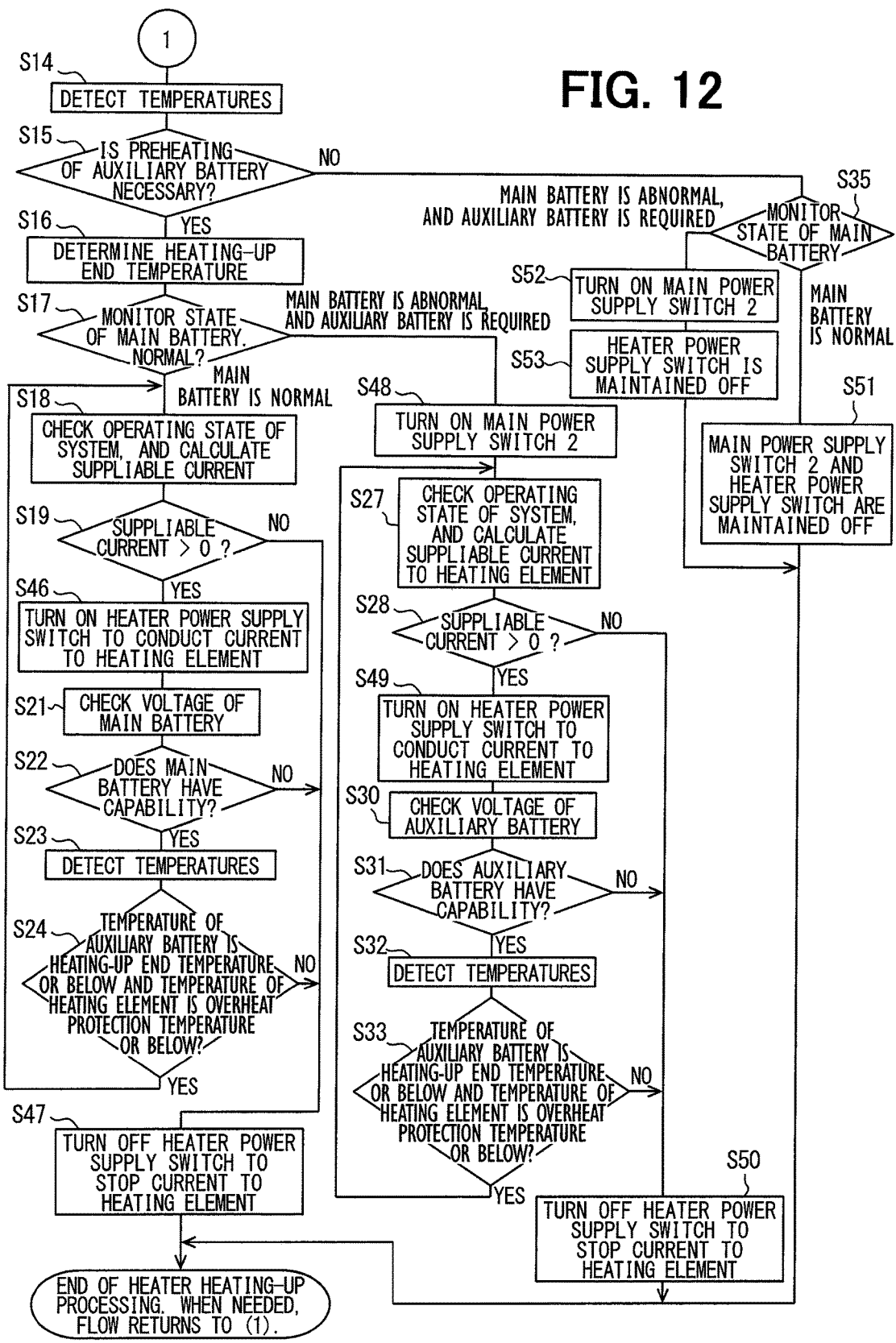
FIG. 12 is a flowchart showing the contents of the control following FIG. 11.

FIGS. 10 to 12 show the second embodiment. The same parts as in the first embodiment are denoted by the same reference numerals and will not be described, and different parts will be described below. As shown in FIG. 10, in an in-vehicle emergency notification device 31, the main power supply switch 13 is deleted, and power from the main-battery power supply circuit 12 is supplied to the control circuit 3, the emergency notification communication circuit 4, and the like at all times. The first and second power supply switches 17, 18 in the first embodiment are replaced with main power supply switches 32, 33 (first and second power supply path formation units, MPS-SW1, MPS-SW2). Further, a heater power supply switch 34 (current conducting switch, first and second power supply path formation units) is inserted on the ground side of the heater resistor 16. That is, in the in-vehicle emergency notification device 31, at the time of conducting the current to the heater resistor 16, either one of the main power supply switches 32 and 33 and the heater power supply switch 34 are turned on.

Next, the operation of the second embodiment will be described. Hereinafter, in flowcharts shown in FIGS. 11 and 12, processing changed in accordance with changes in the configuration as to the switches from the flowcharts shown in FIGS. 3 and 4 in the first embodiment will be described.

<Step S41 (←S1)>

The main power supply switches 32, 33 (described as the main power supply switches (1), (2) in FIG. 11) and the heater power supply switch 34 are all turned off.

<Steps S42, S43 (←S4, S6)>

The main power supply switch 33 and the heater power supply switch 34 are turned on. By this processing, the power of the auxiliary battery 14 is supplied to the heater resistor 16 as in the first embodiment.

<Step S44 (←S8)>

The main power supply switch 33 and the heater power supply switch 34 are turned off.

In step S45, which is added between steps S10 and S14, the main power supply switch 32 is turned on.

<Step S46 (←S20)>

The heater power supply switch 34 is turned on. That is, the main power supply switch 32 and the heater power supply switch 34 are turned on, so that the power of the main battery 7 is supplied to the heater resistor 16 as in the first embodiment.

<Step S47 (←S25)>

The heater power supply switch 34 is turned off. That is, the power supply to the heater resistor 16 is stopped.

<Step S48 (←S26)>

The main power supply switch 33 is turned on. This processing may be controlled by hardware.

<Step S49 (←S29)>

The heater power supply switch 34 is turned on.

<Step S50 (←S34)>

The heater power supply switch 34 is turned off. That is, the power supply to the heater resistor 16 is stopped.

<Step S51 (←S36)>

The main power supply switch 33 and the heater power supply switch 34 are maintained off.

<Step S52 (←S37)>

The main power supply switch 32 is turned on. Since the main power supply switch 32 is turned on in step S45, the power of the auxiliary battery 14 is supplied through the main power supply switches 32, 33 to the control circuit 3 and the emergency notification communication circuit 4. Further, a diode (not shown) is disposed on the main-battery power supply circuit 12 side, which prevents the backflow of the current of the auxiliary battery 14 to the main battery 7.

In step S53, which is added subsequent to step S52, the heater power supply switch 34 is maintained off. The processing of S52 may be controlled by hardware.

Further, in S46, S49, control is performed by turning on/off the heater power supply switch 34 with the PWM signal so that the current conducting to the heater resistor 16 does not exceed the suppliable current, as in S20, 29.

As described above, according to the second embodiment, the first and second power supply path formation units include the main power supply switch 32 and the main power supply switch 33, and the heater power supply switch 34 disposed between the heater resistor 16 and the ground. That is, the switches are disposed on both positive and negative sides of the heater resistor 16; therefore, it is possible to more reliably stop the current conduction to the heater resistor 16.

(Third Embodiment)

Figure 13:
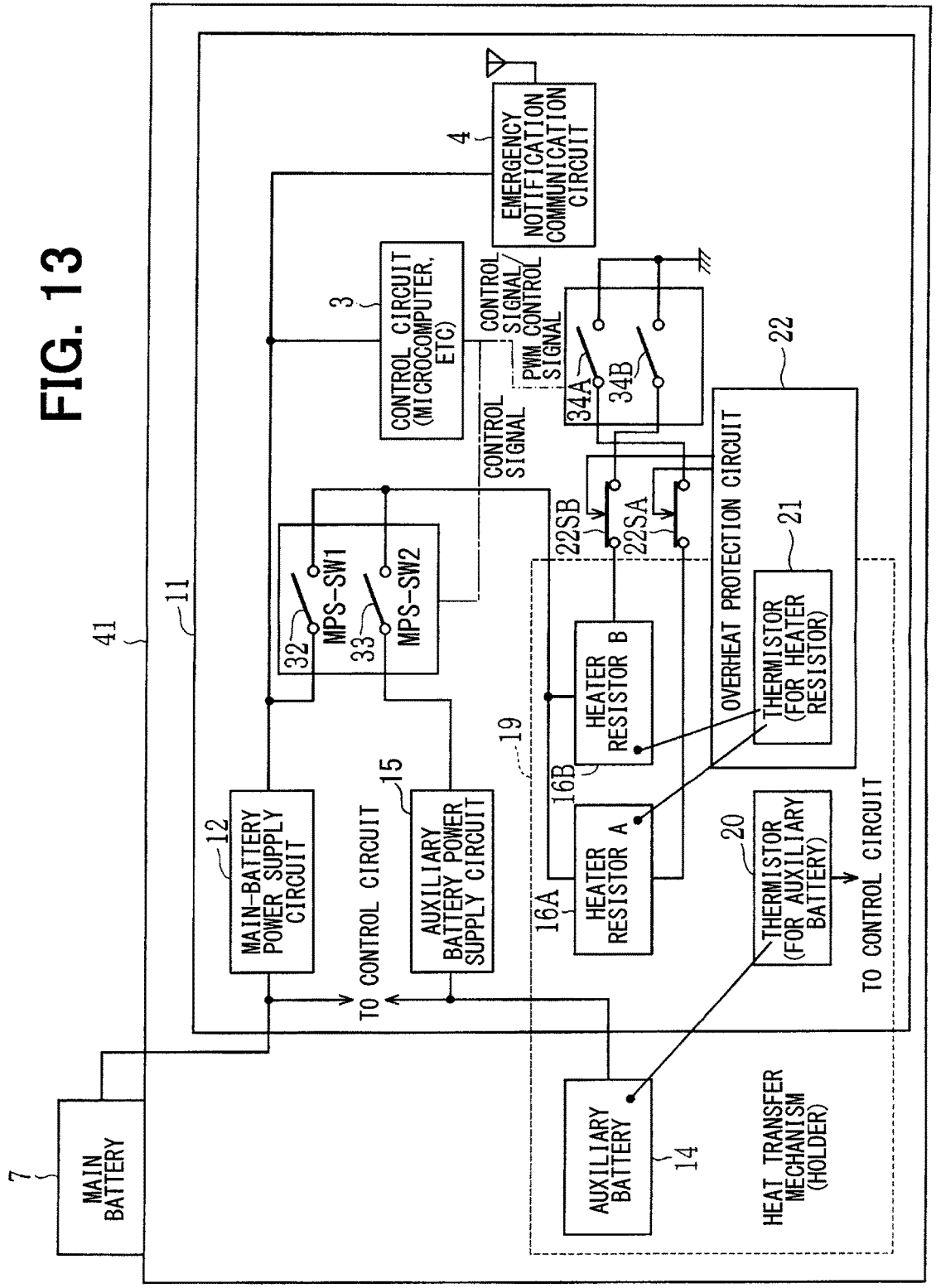
FIG. 13 is a functional block diagram showing a partial configuration of an in-vehicle emergency notification device according to a third embodiment of the present disclosure.
Figure 14:
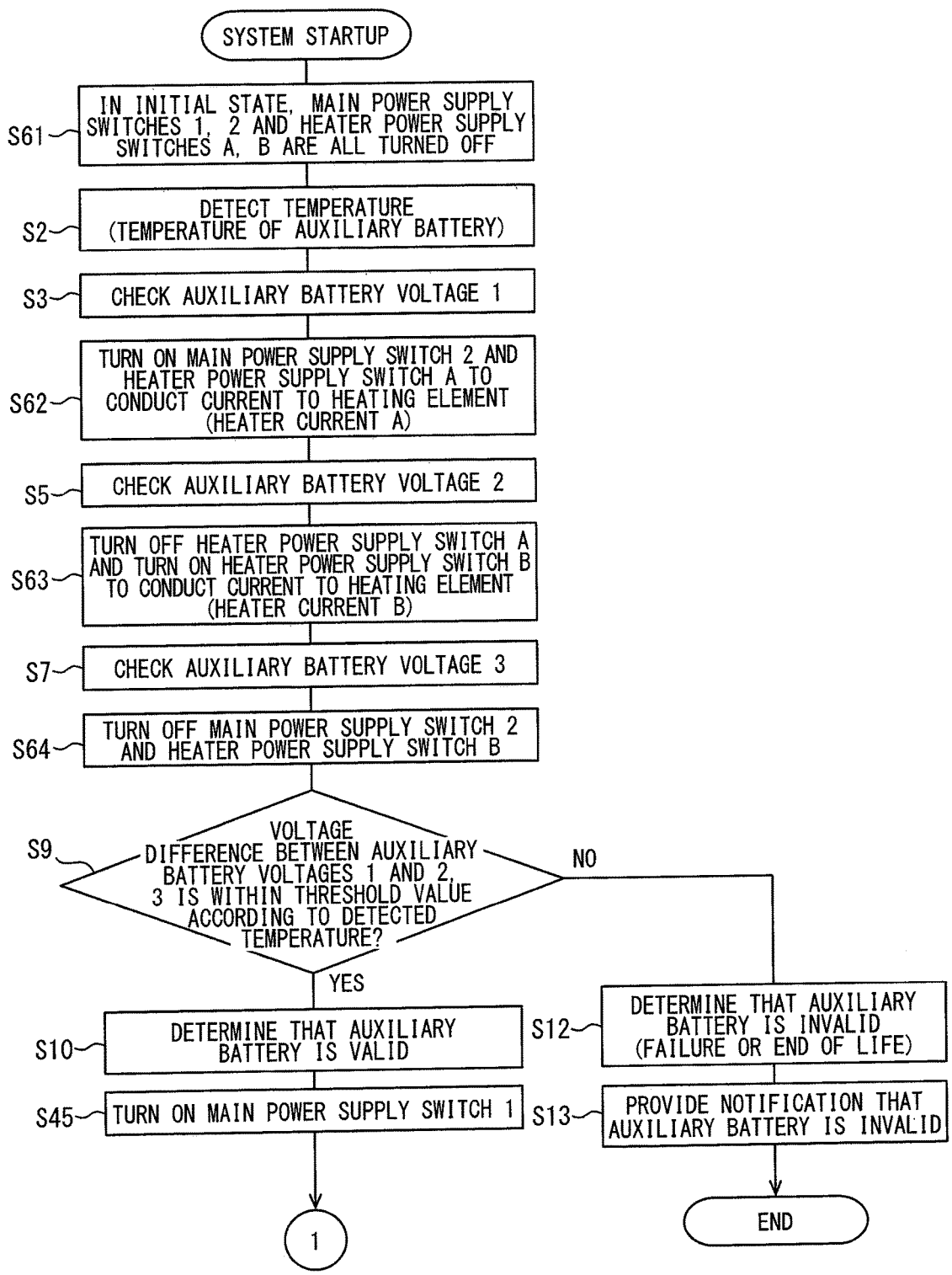
FIG. 14 is a flowchart showing contents of a control.
Figure 15:
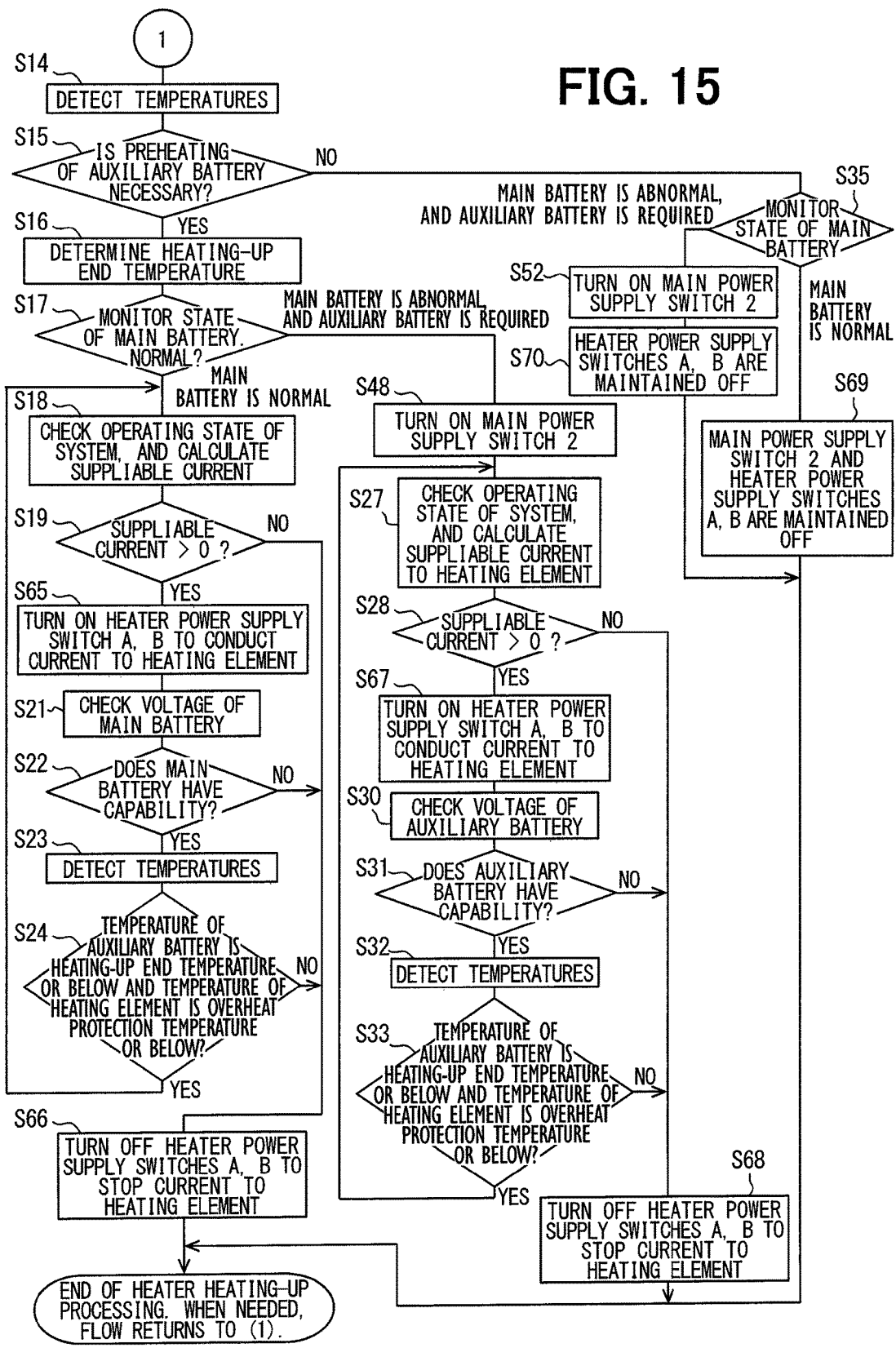
FIG. 15 is a flowchart showing the contents of the control following FIG. 14.

FIGS. 13 to 15 show the third embodiment, and parts different from those of the second embodiment will be described. As shown in FIG. 13, an in-vehicle emergency notification device 41 includes two heater resistors 16A, 16B, and corresponding thereto, two heater power supply switches 34A, 34B are inserted on the ground side. Further, the normally closed switches 22S (22SA, 22SB) of the overheat protection circuit 22 are disposed corresponding to the heater resistors 16A, 16B, respectively. The resistance values (power consumptions) of the heater resistors 16A, 16B are set to different values (e.g., 16A>16B). The other configuration is the same as that of the second embodiment.

Next, the operation of the third embodiment will be described. Hereinafter, in flowcharts shown in FIGS. 14 and 15, processing changed from the flowcharts shown in FIGS. 11 and 12 in the second embodiment will be described.

<Step S61 (←S41)>

The main power supply switches 32, 33 and the heater power supply switches 34A, 34B are all turned off.

<Step S62 (←S42)>

The main power supply switch 33 and the heater power supply switch 34A are turned on, so that the power of the auxiliary battery 14 is supplied to the heater resistor 16A.

<Step S63 (←S43)>

After the heater power supply switch 34A is turned off, the main power supply switch 33 and the heater power supply switch 34B are turned on, so that the power of the auxiliary battery 14 is supplied to the heater resistor 16B. That is, by the processing of steps S62 and S63, different current values are supplied from the auxiliary battery 14.

<Step S64 (←S44)>

The main power supply switch 33 and the heater power supply switch 34B are turned off.

<Step S65 (←S46)>

The heater power supply switch 34A and/or 34B is turned on. In step S65, control is performed by turning on either or both of the heater power supply switches 34A and/or 34B so that the current conducted to the heater resistors 16A, 16B does not exceed the suppliable current calculated in step S18.

<Step S66 (←S47)>

The heater power supply switches 34A, 34B are turned off.

<Step S67 (←S49)>

Same as in step S65.

<Step S68 (←S50)>

Same as in step S66.

<Step S69 (←S51)>

The main power supply switch 33 and the heater power supply switches 34A, 34B are maintained off.

<Step S70 (←S53)>

The heater power supply switches 34A, 34B are maintained off.

As described above, according to the third embodiment, the heater resistors 16A, 16B are configured so that power consumption can be switched in a plurality of levels. When the temperature of the auxiliary battery 14 falls to the operable temperature or below, the control circuit 3 predicts power necessary for operation, and controls the current conduction to the heater resistors 16A, 16B so as to switch the power consumption of the heater resistors 16A, 16B so that the power consumption of the heater resistors 16A, 16B falls below the predicted power. Thereby, it is possible to appropriately control the power consumption.

Further, the control circuit can control the current conduction to the heater resistor 16 so that the power consumption of the heater resistor 16 changes in accordance with the usage of the heater resistor 16. For example, if heating the auxiliary battery 14 by the heater resistor 16 is a main purpose, the current is conducted to only the heater resistor 16A or both the heater resistors 16A, 16B, and if checking the power supply capacity of the auxiliary battery 14 is a main purpose, the current is conducted to only the heater resistor 16B. Therefore, it is possible to consume power in accordance with the usage. Particularly, in devices that might malfunction due to the occurrence of noise associated with PWM control, by using the heater resistors 16A, 16B properly in accordance with the usage, desired power can be consumed only by on/off control without PWM control.

The present disclosure is not limited to the embodiments described above or shown in the drawings, and the following modifications or enlargements can be made.

In the first embodiment, if the temperature of the auxiliary battery 14 decreases to the operable temperature or below, the control circuit 3 does not necessarily need to check the current supply capability of the main battery 7, and the current may be conducted to the heater resistor 16 from the auxiliary battery 14 immediately.

The heating element may be one other than the chip resistor such as the heater resistor 16.

The thermistor 21 and the overheat protection circuit 22 can be provided as necessary.

In the third embodiment, thermistors for detecting the respective temperatures of the heater resistors 16A, 16B may be provided individually.

Further, in the third embodiment, three or more heater resistors 16 may be provided.

The present disclosure may be applied to a device other than the in-vehicle emergency notification device.

While the present disclosure has been described in accordance with the above embodiments, it is understood that the present disclosure is not limited to the above embodiments and structures. The present disclosure embraces various changes and modifications within the range of equivalency. In addition, various combinations and modifications and other combinations and modifications including only one element or more or less than one element are within the scope and sprit of the present disclosure.

What is claimed is:

1. An electronic device that operates with power supplied from an external main battery and incorporates an auxiliary battery as a standby power supply for the main battery, the electronic device comprising:

a heating element that heats the auxiliary battery;

a first power supply path formation unit that forms a first power supply path for supplying power from the main battery to the heating element;

a second power supply path formation unit that forms a second power supply path for supplying power from the auxiliary battery to the heating element;

a control circuit that controls the first and second power supply path formation units to form the first or second power supply path so as to conduct a current to the heating element; and a temperature detection unit that detects a temperature of the auxiliary battery, wherein the control circuit monitors a power supply state of the main battery, and when the temperature of the auxiliary battery falls to an operable temperature or below and when power supply from the main battery is available, the control circuit forms the first power supply path so as to conduct the current to the heating element, after detection of the temperature of the auxiliary battery, when an amount of voltage change of the auxiliary battery detected before and after formation of the second power supply path or an amount of voltage change of the auxiliary battery detected when the amount of current conducted to the heating element after formation of the second power supply path is changed in a plurality of levels exceeds a predetermined threshold value, the control circuit determines that the auxiliary battery is abnormal or has reached an end of life, and the control circuit determines the operable temperature, based on a voltage change of the auxiliary battery with respect to the temperature of the auxiliary battery.

2. The electronic device according to claim 1, wherein the first power supply path formation unit includes a first power supply switch disposed between the main battery and the heating element, and the second power supply path formation unit includes a second power supply switch disposed between the auxiliary battery and the heating element.

3. The electronic device according to claim 1, wherein the first and second power supply path formation units are configured with:

a first power supply switch disposed between the main battery and the heating element;

a second power supply switch disposed between the auxiliary battery and the heating element; and a current conducting switch disposed between the heating element and a ground.

4. The electronic device according to claim 1, wherein when the temperature of the auxiliary battery falls to the operable temperature or below and when power supply from the main battery is unavailable, the control circuit forms the second power supply path so as to conduct the current to the heating element.

5. The electronic device according to claim 1, wherein the control circuit determines a heating-up end temperature of the auxiliary battery, based on the operable temperature.

6. The electronic device according to claim 1, wherein
when the temperature of the auxiliary battery falls to the operable temperature or below, the control circuit predicts power necessary for operation, and
when the control circuit determines that supply of the power becomes unavailable by conducting the current to the heating element, the control circuit stops to conduct the current to the heating element.

7. The electronic device according to claim 6, wherein
the control circuit determines, by referring to terminal voltages of the main and auxiliary batteries, whether or not the supply of the power is available.

8. The electronic device according to claim 6, wherein
the control circuit determines output capacity of the auxiliary battery, based on a state of current conducted to the heating element.

9. The electronic device according to claim 8, wherein
the control circuit determines the output capacity, by referring to a terminal voltage of the auxiliary battery.

10. The electronic device according to claim 1, wherein
the heating element is configured so that power consumption is switched in a plurality of levels, and
the control circuit controls conduction of the current to the heating element so as to switch the power consumption of the heating element in accordance with usage of the heating element.

11. An electronic device that operates with power supplied from an external main battery and incorporates an auxiliary battery as a standby power supply for the main battery, the electronic device comprising:
a heating element that heats the auxiliary battery;
a first power supply path formation unit that forms a first power supply path for supplying power from the main battery to the heating element;
a second power supply path formation unit that forms a second power supply path for supplying power from the auxiliary battery to the heating element;
a control circuit that controls the first and second power supply path formation units to form the first or second power supply path so as to conduct a current to the heating element; and
a temperature detection unit that detects a temperature of the auxiliary battery, wherein
when the temperature of the auxiliary battery falls to an operable temperature or below, the control circuit forms the second power supply path so as to conduct the current to the heating element,
after detection of the temperature of the auxiliary battery, when an amount of voltage change of the auxiliary battery detected before and after formation of the second power supply path or an amount of voltage change of the auxiliary battery detected when the amount of current conducted to the heating element after formation of the second power supply path is changed in a plurality of levels exceeds a predetermined threshold value, the control circuit determines that the auxiliary battery is abnormal or has reached an end of life, and
the control circuit determines the operable temperature, based on a voltage change of the auxiliary battery with respect to the temperature of the auxiliary battery.

12. An electronic device that operates with power supplied from an external main battery and incorporates an auxiliary battery as a standby power supply for the main battery, the electronic device comprising:
a heating element that heats the auxiliary battery;
a first power supply path formation unit that forms a first power supply path for supplying power from the main battery to the heating element;
a second power supply path formation unit that forms a second power supply path for supplying power from the auxiliary battery to the heating element;
a control circuit that controls the first and second power supply path formation units to form the first or second power supply path so as to conduct a current to the heating element; and
a temperature detection unit that detects a temperature of the auxiliary battery, wherein
the heating element is configured so that power consumption is switched in a plurality of levels,
the control circuit monitors a power supply state of the main battery,
when the temperature of the auxiliary battery falls to an operable temperature or below and when power supply from the main battery is available, the control circuit forms the first power supply path so as to conduct the current to the heating element, and
when the temperature of the auxiliary battery falls to the operable temperature or below, the control circuit predicts power necessary for operation, and controls conduction of the current to the heating element so as to switch the power consumption so that the power consumption of the heating element falls below the predicted power.

13. An electronic device that operates with power supplied from an external main battery and incorporates an auxiliary battery as a standby power supply for the main battery, the electronic device comprising:
a heating element that heats the auxiliary battery;
a first power supply path formation unit that forms a first power supply path for supplying power from the main battery to the heating element;
a second power supply path formation unit that forms a second power supply path for supplying power from the auxiliary battery to the heating element;
a control circuit that controls the first and second power supply path formation units to form the first or second power supply path so as to conduct a current to the heating element; and
a temperature detection unit that detects a temperature of the auxiliary battery, wherein
the heating element is configured so that power consumption is switched in a plurality of levels,
when the temperature of the auxiliary battery falls to an operable temperature or below, the control circuit forms the second power supply path so as to conduct the current to the heating element, and
when the temperature of the auxiliary battery falls to the operable temperature or below, the control circuit predicts power necessary, for operation, and controls conduction of the current to the heating element so as to switch the power consumption so that the power consumption of the heating element falls below the predicted power.

* * * * *